United States Patent [19]
Kinnear

[11] Patent Number: 5,163,290
[45] Date of Patent: Nov. 17, 1992

[54] IGNITION SYSTEM BATTERY FOR PREHEATING OF AUTOMOTIVE CATALYTIC CONVERTER

[75] Inventor: James W. Kinnear, White Plains, N.Y.

[73] Assignee: Texaco Inc., White Plains, N.Y.

[21] Appl. No.: 849,568

[22] Filed: Mar. 11, 1992

[51] Int. Cl.⁵ .............................. F01N 3/20
[52] U.S. Cl. ........................ 60/274; 60/284; 60/300
[58] Field of Search ................. 60/274, 284, 300

[56] References Cited

U.S. PATENT DOCUMENTS

| | | | |
|---|---|---|---|
| 3,455,403 | 7/1969 | Hawthorne | 123/179.2 |
| 4,102,127 | 7/1978 | Saiki | 60/300 |
| 4,227,588 | 10/1980 | Biancardi | 123/179.2 |
| 4,674,454 | 6/1987 | Phairr | 123/179.2 |

FOREIGN PATENT DOCUMENTS 2062500  6/1972  Fed. Rep. of Germany ........ 60/284

Primary Examiner—Douglas Hart
Attorney, Agent, or Firm—Robert A. Kulason; James J. O'Loughlin; Robert B. Burns

[57] ABSTRACT

Method and apparatus for initiating electrical preheating of the catalytic converter the exhaust gas system of an internal combustion engine. The latter includes an ignition system having a battery as the engine starting medium, which is provisionally connected to the catalytic converter's heater element to raise the catalytic converter from ambient temperature, to an intermediate temperature, and subsequently to a temperature at which the catalytic converter will most effectively function.

10 Claims, 2 Drawing Sheets

IGNITION SYSTEM BATTERY FOR PREHEATING OF AUTOMOTIVE CATALYTIC CONVERTER

BACKGROUND OF THE INVENTION

The cranking and start up of engines fueled by hydrocarbon-based fuels, such as gasoline, can exhibit the undesirable effect of discharging deleterious exhaust emissions or gases into the atmosphere. These exhaust gas emissions, prior to any pre-discharged treatment, usually contain environmentally unacceptable components as $NO_x$, CO, and unburned hydrocarbons.

It can be appreciated when one considers the number of automobiles in daily service, that the amount of untreated engine exhaust which is delivered into the atmosphere is virtually immeasurable. In spite of the number of catalytic converters presently in service which treat the exhaust gas prior to its discharge, the volume which flows past cold catalyst beds and consequently remains marginally treated, is still considerable.

In brief, the issue of a clean atmospheric environment suggests future air quality problems on a worldwide basis. Nonetheless, each step even though minor, toward limiting the daily rate of pollutant gases which enter the atmosphere, must be welcome.

One common practice known and accepted commercially for treating exhaust gases prior to their release into the atmosphere, is to convert the gases into less noxious fumes. A widely used and successfully practiced treatment for hot exhaust gas which leaves an automobile or truck engine at a temperature of up to 2000° F., is to bring the gas into contact with an active catalyst to prompt the desired chemical conversion. This method is designed to receive and treat a steady flow of hot exhaust gas as it is being produced from an internal combustion engine.

Physically, even a brief contact period between a heated catalyst material which should preferably be at least 700°-900° F. and a stream of the engine exhaust gas, can be effective in achieving conversion of the gas into a less harmful condition. It is important to note however that this reaction, if utilized to its maximum potential, requires a preferred operating catalyst temperature in excess of about 900° F.

It is known, for example, that for initial start up of any engine equipped vehicle having an exhaust system catalytic converter, the catalyst will in all probability not be at a sufficiently high temperature to be effective. Thus, for the first several minutes or miles of the engine's operation, exhaust emissions will enter the atmosphere only marginally treated.

During a cold engine's start up, the engine's exhaust gas becomes progressively hotter as engine parts become heated. As the initially produced gas contacts the catalyst, the latter will likewise become heated from ambient to the temperature of the exhaust gas.

During this initial or warm-up period as noted, there will be minimal, if any reaction in exhaust gas conversion to a less noxious state since the temperature of the catalyst is too low to promote such a reaction. Subsequent to the warm-up period, however, due to heat exchange with the hot exhaust gas stream with the catalytic bed, the latter will be heated to a temperature at which it is capable of achieving maximum effectiveness.

It is known to initially heat the catalyst heater element using the vehicle's ignition system battery. By initially applying the full power of the ignition battery to the catalyst heating element, the catalyst will after a period, become sufficiently hot to prompt exhaust gas conversion.

In any such heating operation however, the characteristics of an electrical resistance heater are such that unless the battery has its rated capability and is fully charged, it will be drained by the catalyst preheating step. Unfortunately, after the catalyst is heated to a desired operating temperature, the battery may lack the necessary power particularly under cold conditions to crank and start the engine.

The maximum energy obtainable from a storage battery when it is at a particular state of charge and temperature will vary with the rate at which the energy is withdrawn. In other words, to realize maximum efficiency of energy transfer from a battery to an external load such as an exhaust gas heated catalyst heater, a specific current draw program must be followed. This would assure a maximum level of energy remaining in the battery to power the crank and engine start cycle.

In brief, injudicious use of the ignition battery, in view of the battery's limited capacity, can result in a fully heated catalyst, yet a condition which prohibits engine start up.

In addition, rapid catalyst heating which tends to drain a battery and which requires rapid recharging, can have an adverse effect on the battery's life. This sort of rapid discharge schedule and subsequent recharging is a sure invitation to accelerate battery replacement.

SUMMARY OF THE INVENTION

To avoid the stated problem, the invention provides a means for monitoring and regulating battery power delivered during the catalyst preheating process to optimize the rate of energy delivered, and thus conserve battery power and life. Most effective utilization of the battery power during the converter heating event is achieved in part by a continuous determination of the battery's available strength or energy level. Further, to facilitate engine starting, catalyst heating is accomplished during a period extending across a plurality of heating phases. Thus, during a preliminary heating phases or phases, the catalyst is elevated to, and maintained at an initial or intermediate temperature. Thereafter, when the engine is about to be started, it will take but a minimum amount of time to complete the heating period which brings the catalyst to operating temperature. In brief, the battery energy level is continuously monitored and, the heating rate is adjusted commensurably and controlled to optimize use of the available battery energy.

The catalyst heating procedure is automatically stopped if and when there is an apparent danger of using so much of the battery's power that normal starting of the engine might be marginal due to the above noted insufficient remaining battery energy.

This contingency is avoided by monitoring with a counter or other suitable instrumentation the heating step frequency of occurrence.

Most effective utilization of the battery relative to the catalyst converter heating event, is achieved by a determination or calculation of the battery's available strength, prior to start-up of the engine. Thus, a decreasing battery energy level signal is generated, and is compared with a predetermined signal indicative of an accepted level of battery energy needed for engine start up. Comparison of the two signals allows an operator to ascertain the immediate state of battery energy available toward the catalyst heating function.

The battery energy level or heating capability, is continuously calculated preferably through use of data processing means which receives the necessary data input relative to the battery's immediate strength. It also receives data on such factors as ambient temperature and catalytic converter temperature. Based on this input data, an output signal is generated which either allows the catalyst heating function to continue, or causes the heating function to be by passed, allowing engine starting only.

During the catalyst heating period the generated signal may indicate insufficient battery capacity to both heat the catalyst and start the engine. To counter this situation, the control means will automatically revert the battery to its normal function primarily for starting the engine, secondarily for supporting other electrical circuits in the vehicle.

To preserve the battery and or noted above, extend its usable life, the catalyst heating event is accomplished over an extended time period. Further, the initial catalyst heating phase is carried out in timed increments which serve to maintain the catalyst through a series of heating cycles, to a temperature less than the catalyst operating temperature. For a catalyst having an operating temperature of about 900° F., the intermediate temperature could be between 300° F. to 800° F. In the second heating phase, the catalyst will be raised to operating temperature immediately prior to engine start up.

OBJECT OF THE INVENTION

It is therefore an object of the invention to provide an exhaust gas treating system having a catalyst converter which is prepared for contacting exhaust gas by preheating the catalyst electrically to bring it to an elevated operating temperature.

It is a further object to provide method and apparatus for preheating the catalyst in an engine's exhaust gas system prior to starting the engine, which preparation is achieved in the manner to preserve the vehicle's battery from being depleted of energy.

DESCRIPTION OF THE INVENTION

Figure 1:
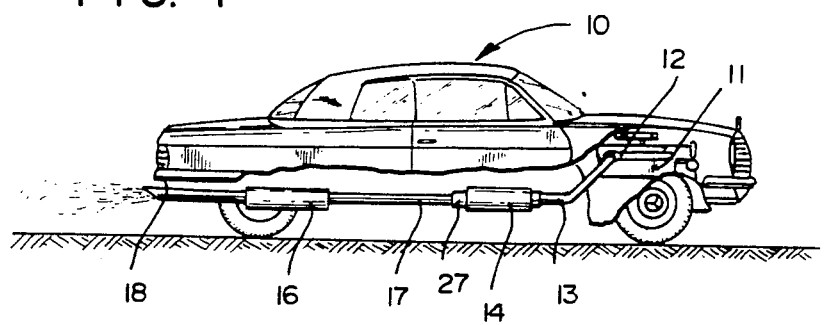
FIG. 1 is an elevation view of the invention as incorporated into a vehicle.

As shown in FIG. 1, to illustrate the invention the disclosed exhaust gas treating system is incorporated into a vehicle 10 which is powered by an internal combustion engine 11.

Vehicle 10 includes a forward mounted, gasoline or diesel fueled engine 11 as the primary automotive power source. Hot exhaust gas produced while the engine operates, is directed from the engine's exhaust manifold 12, into an exhaust header or conduit 13, and thereafter into a catalytic converter 14. From converter 14, a treated gas stream is introduced to the vehicle's muffler 16 by way of a conduit 17, then discharged into the atmosphere through the system's tail pipe 18.

Figure 2:
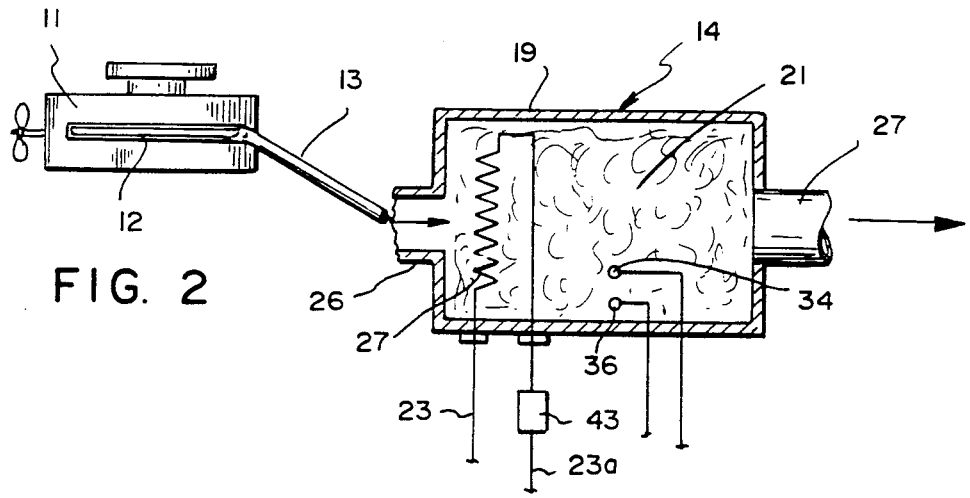
FIG. 2 is a cross-sectional view on an enlarged scale of a segment of FIG. 1.

Referring to FIG. 2, in one embodiment, catalytic converter 14 is comprised of a metallic casing 19, generally oval or relatively flat in cross section, which encloses a catalyst material. The latter can embody a number of physical forms but is normally comprised of a gas permeable mass shaped into a bed 21. Associated with bed 21, a heating element 22 is positioned within casing 19 located to most effectively preheat catalyst bed 21 preliminary to a hot exhaust gas stream from header 13 entering the converter.

Heater element 22, normally an electrical resistance member, can take any one of several embodiments so long as it is located in heat exchange association with the catalyst mass. It further includes at least 2 terminals 23 and 23a which extend through the wall of casing 19 to connect with the vehicle's electrical power control source. Casing 19 includes an inlet 26 at one end, which engages exhaust manifold or header 12 by way of conduit 13 to receive the stream of hot exhaust gas.

A discharge or outlet port 27 at the casing down stream end releases a treated gas stream into conduit 17. The treated exhaust gas, now comprising a mixture of less noxious, or a more environmentally acceptable mixture of gases will flow through muffler 16 and thence enter the atmosphere.

Figure 3:
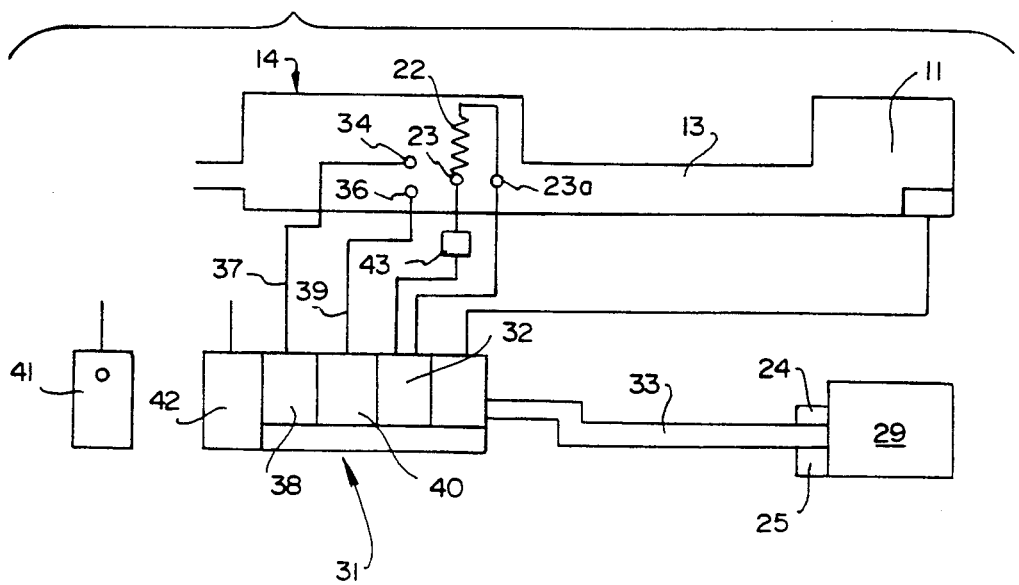
FIG. 3 is a schematic diagram representing an arrangement for controlling the battery's function between engine starting and catalyst heating.

Referring to FIG. 3, heater element 22 is activated when powered by a convenient electrical energy or power source such as a 12 volt battery 29 of the type usually associated with a vehicle's ignition system. The battery will, as noted, normally be utilized to power other electrical systems such as the vehicle's head lights, trunk lock, door locks, wipers, etc. However, the battery will be dedicated exclusively for catalyst preheating when it is segregated from other electrical circuits and when the vehicle's engine is not running.

In one embodiment of the control apparatus for catalyst heating, the vehicle's ignition system includes the normal equipment for creating a high-intensity spark. The latter is transmitted sequentially to each cylinder of the engine 11. In the instance of a diesel engine this type of spark system will not be used considering the nature of the diesel combustion cycle.

As noted, the primary source of energy in the ignition circuit includes at least one, and if needed, a plurality of batteries 29. The latter is normally comprised of a 12 volt direct current storage battery having two poles or electrodes 24 & 25. The battery poles are connected to a first transducer 32 by line 33 for determining battery voltage. This part of the circuit is continuously monitored through said first transducer 32 which delivers a digital signal to the input of a calculating facility such as a computer 31.

To facilitate its two primary functions, battery 29 is selectively connected to the engine starting mode, or to the catalyst heating mode. This switching operation is achieved through the remote transmitter or transceiver 41 which when activated, sends RF signals from a distance away from catalytic converter 14. For example, an operator, even though several hundred feet from vehicle 10 or the catalytic converter 14, can initiate the catalyst heating event by transmitting a wireless, RF signal which is picked up by the control unit transceiver 42 at the vehicle site.

Control of the catalyst heating event, particularly toward achieving maximum operating temperature in catalyst bed 21, is a function of one or more temperature sensors 34 & 36 placed within the bed. Sensor 34 is connected through a line 37 to a second transducer 38 to transmit temperature data from catalyst bed 21 to the computer 31. Similarly, sensor 36 is connected through line 39 to a third transducer 40.

To most effectively utilize battery 29, heat sensors 34 & 36 operate within different temperature ranges to allow two phases of heating. In the first heating phase, sensor 34 functions to limit catalyst heating to a the intermediate temperature of between 300° F. to 800° F. At the preset maximum temperature, heating will be interrupted and not resumed until the catalyst temperature drops sufficiently below a predetermined minimum value to reactivate heater 22.

Referring to FIG. 3, the first or initial catalyst preheating phase is regulated to avoid heater 22 drawing excessive energy from the battery. Thus, the heater control circuit can include a heating cycle counter 43 which is connected into the heating circuit to monitor the number of times that the heating cycle is by-passed to safeguard the battery cranking power.

When this cyclical heating limit has been reached, the second or final heating phase will be automatically bypassed and the battery will be automatically switched into the engine starting mode.

Actuation of the second or final phase of catalyst heating to the desired operating temperature from 800° F. to 900° F., is achieved in one way by disconnecting sensor 34 from the heating circuit and transferring the temperature control function solely to sensor 36. The latter is calibrated to operate within a higher range than sensor 34, to a maximum of approximately 900° F., the desired catalyst temperature for efficiently treating an exhaust gas stream.

The final catalyst heating phase prior to engine starting can be commenced by any one of several means including response to a further or second R.F. signal transmitted to control unit 31. The phase change will result in catalyst heating by the battery being continued until the desired 900° F. operating temperature is reached.

Preferably, the final heating phase is actuated by the operator when he has reached the vehicle and is ready to start the engine. For example, insertion of the vehicle's ignition key into the ignition lock or into the vehicle's door to unlock the latter could concurrently adjust the battery 29 connection to elevate the catalyst temperature to 900° F.

The catalyst when at an intermediate temperature less than operating temperature 900° F. will take but a relatively short period of further heating to raise it to operating temperature of approximately 900° F.

From a practical consideration, the initial or first catalyst heating phase will generally be commenced after the vehicle has been out of operation for an extended period of time, such as overnight. A further application of the disclosed method arises when the vehicle, after it has been running and is warmed, can be maintained at the intermediate temperature if it is contemplated by the operator that the engine will be started after a short idle period.

As a practical matter, to initiate catalyst heating, an operator need not be at the vehicle site, but only at a distance within the operating range of transmitter 41, perhaps 200 or 300 feet. Thus, preliminary catalyst heating during the first heating phase can continue for several minutes without severely effecting battery energy level.

During this preliminary heating phase, the temperature of catalyst bed 21, as well as the battery's decreasing energy level, will be continuously monitored at computer 31. The data recorded by transducers 32, 34 and 38 will be in a constant state of change. Primarily, the energy level of battery 29, needed for starting engine 11, will be monitored to assure that it does not become reduced to the level of being insufficient to complete the starting function.

Starting of the engine with the catalyst at its recommended operating temperature will result in the hot exhaust gas stream being treated as it flows across the hot catalyst. At this point, preheating the catalyst can be discontinued since the hot exhaust gas will thereafter maintain the heating function.

Figure 4:
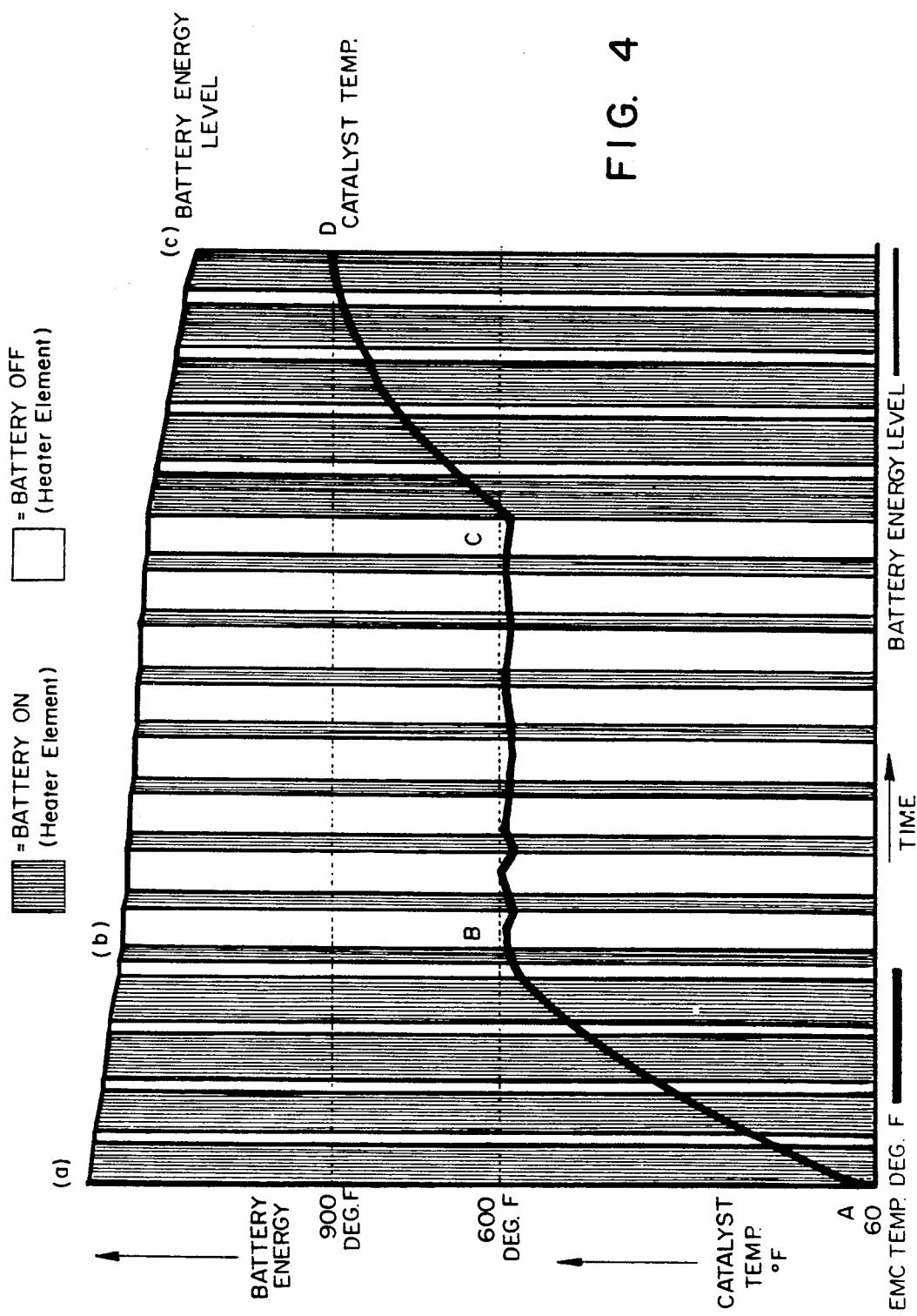
FIG. 4 is a graphical representation of the catalyst temperature elevating schedule during preheating phases.

Referring to FIG. 4, a graphical representation of one embodiment of the two-phase catalyst preheating system is shown wherein the catalytic converter is initially at ambient temperature. Achieving a catalyst operating temperature of about 900° F. is the objective of the heating procedure. An intermediate temperature of about 600° F. is desired to be maintained over a limited time period, measured preferably in catalyst heating and cooling cycles.

Graphically illustrated, a curve representing catalyst temperature during the preheating period is shown superimposed on a graphical representation of the battery's energy level. Since the battery's energy will regress after each successive heating cycle, said level will progressively approach the minimum level available for engine starting. If the vehicle's operator is not prepared to start the engine within a limited time period, the catalyst preheating cycle will be automatically discontinued, and the battery automatically switched into the engine starting phase. Thus, the initial preheating period will not be uncontrollably sustained to the battery's detriment.

Ideally, prior to the battery's energy level becoming eroded to such a low point, the operator should reach a decision whether or not the engine is to be started. At such time, when the operator arrives at the vehicle, the second phase of heating, during which the catalyst is elevated to its operating temperature, can be commenced or initiated in any of several ways. This second heating phase could be triggered as noted herein, merely by the operator unlocking the vehicle door, or actuating a starting circuit by opening the door. Thereafter, actuation of the ignition switch in the normal engine starting function will permit the engine to commence and hot exhaust gas to flow across catalyst at the latter's operating temperature.

Referring again to FIG. 4, the catalyst temperature during the first heating phase will be initially increased from an ambient of, for example, about 60° F., to an intermediate temperature of approximately 600° F. The temperature rise curve will progress upwardly from point (A) (on the graph) to point (B). During this period, the battery's overall energy level will be eroded or decreased in increments as shown between points (a) and (b).

During the catalyst temperature rise time between points A and B, intermediate temperature 600° F., the heater element "on" time will progressively decrease in duration while the "off" period will increase. Each succeeding heating pulse or interval will drain the battery another increment such that battery energy level line between points a–c will be characterized by a stepped, downward progression rather than by a smooth curve.

Between points B and C, during the later portion of the first heating phase, the intermediate 600° F. temperature will be maintained substantially constant while the battery's energy level will continue on a generally downward trend.

Prior to starting the engine, the second catalyst heating phase will be commenced. This heating phase can be remotely initiated by actuation through transmission of RF waves to the controller from transmitter 41, it is preferred however that this final heating phase be commenced when the operator is at the vehicle. The actual switch over to second phase heating (prior to engine starting) can best be affected manually at controller 31 which is interconnected to circuitry associated by switching means which function in response to the physical act of opening the vehicle door or the like.

The final or second heating phase will impose an additional, more accelerated drain on battery energy as the catalyst temperature is raised from point C to point D, the catalyst operating temperature (900° F.).

At 900° F., the catalyst will be at operating temperature and the engine can be started through the usual ignition switch, which will automatically switch the battery from the catalyst heating mode to the engine starting mode.

It is understood that although modifications and variations of the invention can be made without departing from the spirit and scope thereof, only such limitations should be imposed as are indicated in the appended claims.

We claim:

1. Apparatus for electrically preheating the catalytic converter in the exhaust gas system of an internal combustion engine, to a catalyst operating temperature prior to starting the engine, the latter including a battery for starting said engine, and alternately for preheating the catalytic convertor, said apparatus comprising;
   (a) control means for selectively switching said battery between the engine starting mode, and the catalytic converter,
   (b) means for continuously calculating the battery's immediate energy level for comparison with an energy level necessary for engine starting,
   (c) means for sustaining the battery in said catalyst heating mode while the battery's immediate calculated energy level remains at a value in excess of the energy level required for engine starting, and
   (d) means for switching the battery to the engine starting mode when the battery's immediate calculated energy level decreases to a value less than the energy level required for engine starting.

2. In the apparatus as defined in claim 1, including at least one temperature sensor in said catalytic converter connected to said control means to regulate preheating of said catalytic converter to a desired temperature.

3. In the apparatus as defined in claim 1, including a plurality of temperature sensors in said catalytic converter connected to said control means for regulating preheating of the catalyst to its operating temperature through sequential temperature ranges.

4. In the apparatus as defined in claim 1, including means for normally switching said battery from the catalytic converter heating mode to the engine starting mode when an operator contemplates immediate starting of the engine.

5. In the apparatus as defined in claim 3 wherein one of said temperature sensors is characterized by an upper temperature limit approximating the catalyst operating temperature.

6. Method for preheating to its operating temperature, a catalytic converter in an internal combustion engine exhaust system prior to starting the engine, said engine including a battery-powered ignition circuit having control means for selectively switching the battery between an engine starting mode and a catalytic converter heating mode, which method includes the steps of:
   preheating said catalyst converter to an intermediate temperature between ambient temperature and the catalytic converter's operating temperature,
   maintaining the catalyst at said intermediate temperature for a provisional period determined by the battery's immediate energy level,
   heating the catalytic converter to its operating temperature immediately prior to said engine being started.

7. In the method as defined in claim 6 wherein said intermediate temperature lies within the range of approximately 300° F. to 700° F.

8. In the method as defined in claim 6 wherein said intermediate temperature lies within the range of approximately 500° F. to 800° F.

9. In the method as defined in claim 6 including the step of switching said battery to said engine starting mode.

10. Method for preheating to its operating temperature, a catalytic converter in an internal combustion engine exhaust system, said engine including a battery-powered ignition system, and a remotely actuated control means for selectively switching the battery between an engine starting mode, and a catalytic converter heating mode, which method includes the steps of:
   transmitting an RF signal to said remotely activated control means to initiate a first heating phase of the catalytic converter to a temperature between ambient temperature and the catalyst operating temperature,
   immediately prior to starting of said internal combustion engine, heating the catalytic converter through a response heating phase to a temperature at which the catalytic converter normally operates.

* * * * *